United States Patent
Roberge

(10) Patent No.: US 10,378,478 B2
(45) Date of Patent: Aug. 13, 2019

(54) FLOW PATH ROUTING WITHIN A GAS TURBINE ENGINE

(71) Applicant: United Technologies Corporation, Farmington, CT (US)

(72) Inventor: Gary D. Roberge, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 151 days.

(21) Appl. No.: 15/864,297

(22) Filed: Jan. 8, 2018

(65) Prior Publication Data

US 2018/0195463 A1 Jul. 12, 2018

Related U.S. Application Data

(62) Division of application No. 14/489,777, filed on Sep. 18, 2014, now Pat. No. 9,909,529.

(60) Provisional application No. 61/880,205, filed on Sep. 20, 2013.

(51) Int. Cl.
| | |
|---|---|
| *F02C 1/00* | (2006.01) |
| *F02K 1/38* | (2006.01) |
| *F02K 3/075* | (2006.01) |
| *F02K 3/077* | (2006.01) |
| *F02K 3/105* | (2006.01) |

(52) U.S. Cl.
CPC ............ *F02K 1/386* (2013.01); *F02K 3/075* (2013.01); *F02K 3/077* (2013.01); *F02K 3/105* (2013.01); *F05D 2240/122* (2013.01); *F05D 2240/129* (2013.01)

(58) Field of Classification Search
CPC ............ F02K 3/075; F02K 3/077; F02C 9/16
See application file for complete search history.

(56) References Cited

U.S. PATENT DOCUMENTS

| | | | |
|---|---|---|---|
| 4,043,121 A | 8/1977 | Thomas et al. | |
| 4,069,661 A | 1/1978 | Rundell | |
| 4,072,008 A | 2/1978 | Kenworthy | |
| 5,184,459 A | 2/1993 | McAndrews | |
| 5,404,713 A | 4/1995 | Johnson | |
| 7,134,271 B2 * | 11/2006 | Baughman | F01D 5/022 60/226.1 |
| 7,216,475 B2 | 5/2007 | Johnson | |
| 7,246,484 B2 | 7/2007 | Giffin, III et al. | |
| 7,395,657 B2 | 7/2008 | Johnson | |
| 7,614,210 B2 * | 11/2009 | Powell | F02K 1/08 60/226.1 |
| 2005/0047942 A1 | 3/2005 | Grffin | |
| 2006/0096272 A1 | 5/2006 | Baughman | |
| 2007/0186535 A1 | 8/2007 | Powell | |
| 2009/0000271 A1 | 1/2009 | Kupratis | |

* cited by examiner

*Primary Examiner* — Gerald L Sung
(74) *Attorney, Agent, or Firm* — Carlson, Gaskey & Olds, P.C.

(57) ABSTRACT

A method of communicating flow through a gas turbine engine having multiple flow paths according to an exemplary embodiment of the present disclosure includes moving core flow along a core flow path from a compressor section to an exhaust section, selectively communicating a first amount of bypass flow from a bypass flow path defined by a bypass duct to the exhaust section or a second amount of bypass flow from the bypass flow path to the exhaust section, the first amount different than the second amount.

20 Claims, 9 Drawing Sheets

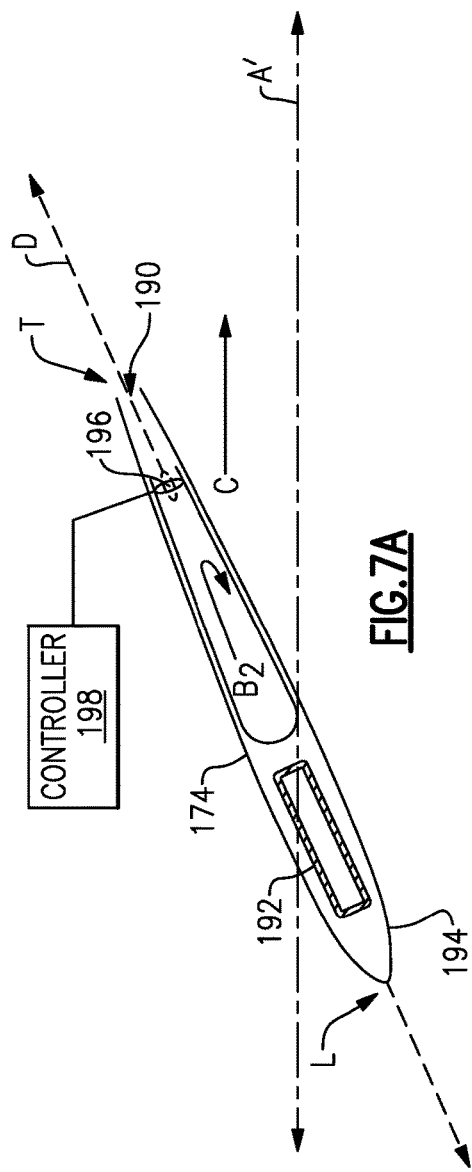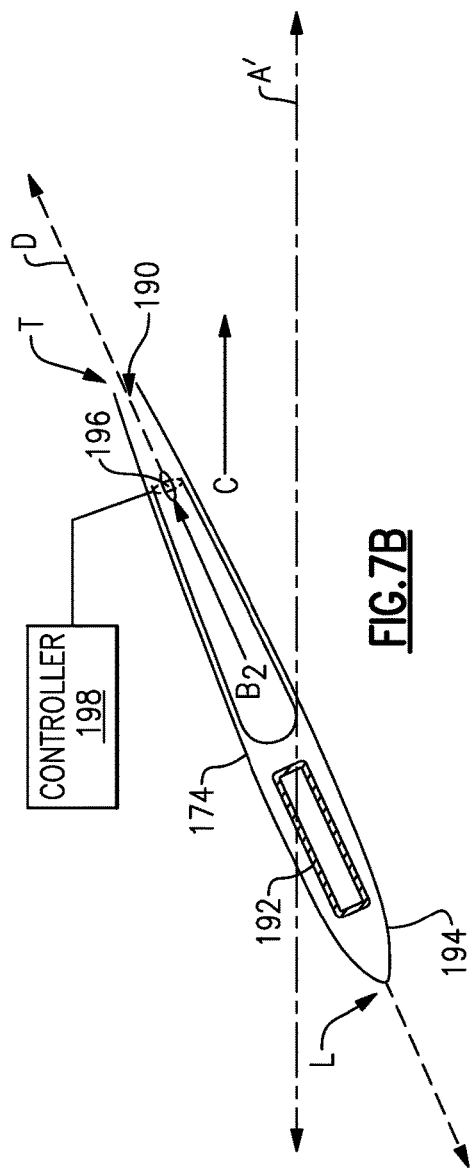

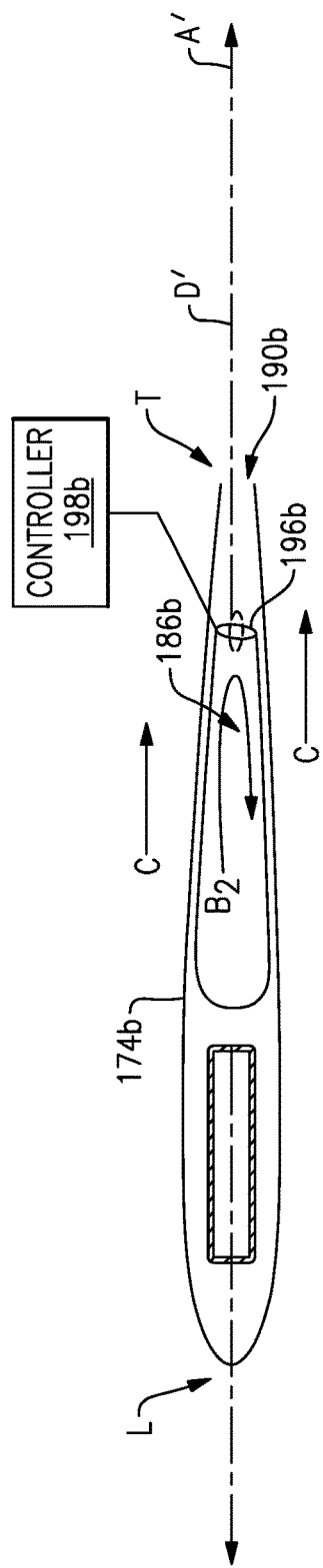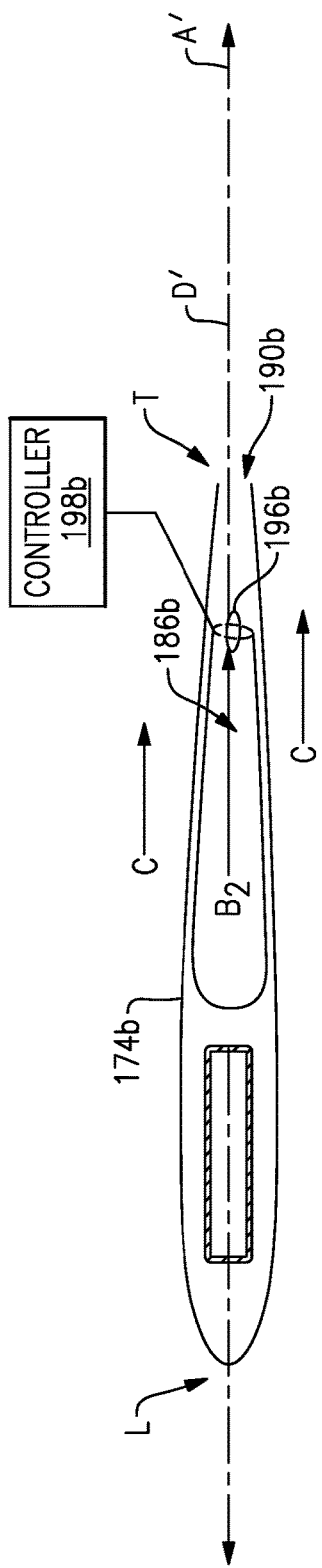

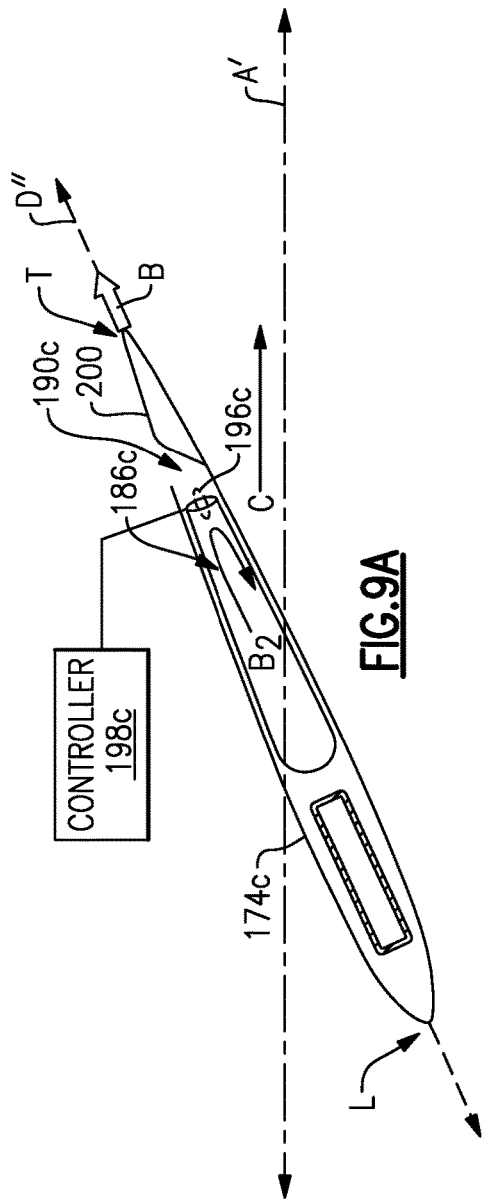
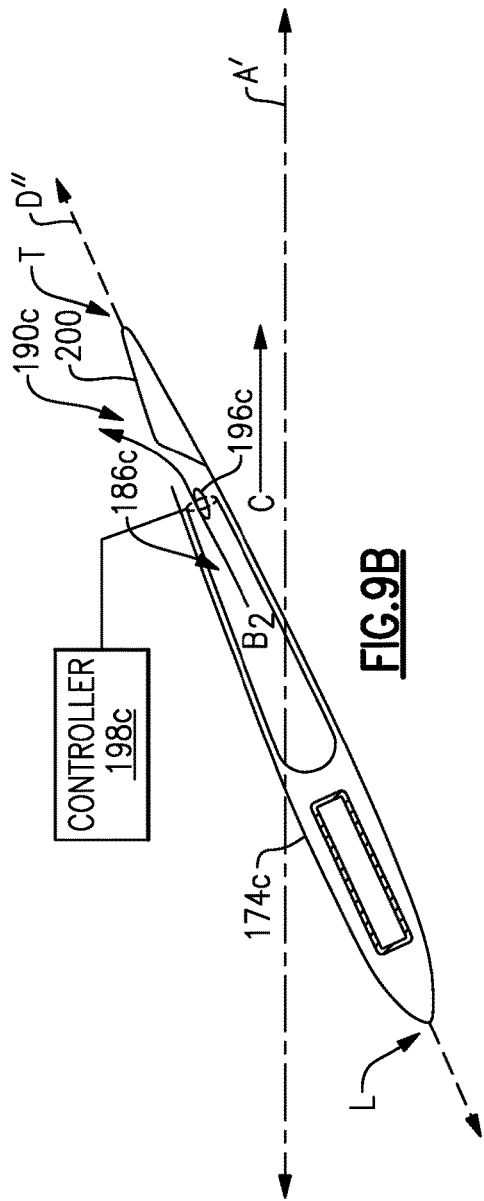

FLOW PATH ROUTING WITHIN A GAS TURBINE ENGINE

CROSS-REFERENCE TO RELATED APPLICATIONS

This application is a divisional of U.S. patent application Ser. No. 14/489,777 filed Sep. 18, 2014, which claims priority to U.S. Provisional Application No. 61/880,205 filed Sep. 20, 2013.

BACKGROUND

This disclosure relates generally to gas turbine engine flow paths and, more particularly, to routing flow from a bypass flow path to another area of the gas turbine engine.

CROSS-REFERENCE TO RELATED APPLICATION

This application claims priority to U.S. Provisional Application No. 61/880,205 filed Sep. 20, 2013.

A gas turbine engine typically includes a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor. The compressor section typically includes low and high pressure compressors, and the turbine section typically includes low and high pressure turbines.

In some gas turbine engines, a speed reduction device, such as an epicyclical gear assembly, is utilized to drive a fan section such that the fan section may rotate at a speed different from, and typically slower than, the turbine section to increase the overall propulsive efficiency of the engine. In such engine architectures, a shaft driven by one of the turbine sections provides an input to the epicyclical gear assembly that drives the fan section at a reduced speed so that both the turbine section and the fan section can rotate at closer to optimal speeds.

SUMMARY

A gas turbine engine with multiple flow paths according to an exemplary aspect of the present disclosure includes, among other things, a core flow path extending from a compressor section to an exhaust section, a bypass duct providing a bypass flow path radially outside the core flow path, and a flow injection device to selectively communicate a first amount of flow or a second amount of flow from the bypass flow path to the exhaust section. The first amount of flow is different than the second amount of flow.

In a further non-limiting embodiment of the foregoing gas turbine engine, the bypass duct is a secondary bypass duct and the bypass flow path is an intermediate bypass flow path. The gas turbine engine further comprises a primary bypass duct providing a fan discharge bypass flow path radially between the intermediate bypass flow path and the core flow path.

In a further non-limiting embodiment of any of the foregoing engines, the flow injection device extends radially across the fan discharge bypass flow path.

In a further non-limiting embodiment of any of the foregoing engines, the bypass flow path extends axially from the compressor section to the exhaust section.

In a further non-limiting embodiment of any of the foregoing engines, the flow injection device comprises an array of vanes distributed annularly about an axis of the gas turbine engine.

In a further non-limiting embodiment of any of the foregoing engines, the gas turbine engine includes an outlet of the flow injection device to the exhaust section. The outlet is upstream from an aft end of a tailcone relative to a general direction of flow through the gas turbine engine.

In a further non-limiting embodiment of any of the foregoing engines, the first amount of flow comprises no flow.

A gas turbine engine device according to another exemplary aspect of the present invention includes, among other things, a flow injection device to selectively communicate a first amount of flow or a second amount of flow from a bypass flow path to an exhaust section of a core flow path. The first amount of flow is different than the second amount of flow.

In a further non-limiting embodiment of the foregoing flow injection device, the bypass flow path is an intermediate bypass flow path and the flow injection device extends across a fan discharge bypass flow path radially between the intermediate bypass flow path and the exhaust section.

In a further non-limiting embodiment of any of the foregoing flow injection devices, the flow injection device comprises a vane extending radially from the bypass flow path to the exhaust section.

In a further non-limiting embodiment of any of the foregoing flow injection devices, the first amount of flow comprises no flow.

In a further non-limiting embodiment of any of the foregoing flow injection devices, the flow injection device includes a flow passage to selectively communicate the first amount of flow or the second amount of flow. The flow passage has an inlet at the bypass flow path and an outlet at the exhaust section.

In a further non-limiting embodiment of any of the foregoing flow injection devices, the outlet extends radially across at least a portion of an annular flow path of the exhaust section.

In a further non-limiting embodiment of any of the foregoing flow injection devices, the outlet is tilted circumferentially to introduce flow to the exhaust section in a direction having a circumferential component.

In a further non-limiting embodiment of any of the foregoing flow injection devices, the outlet introduces flow against a closeout projecting circumferentially from the flow injection device. The closeout is to direct flow from the outlet circumferentially.

In a further non-limiting embodiment of any of the foregoing flow injection devices, the outlet is aligned with a centerline of the gas turbine engine to introduce flow to the exhaust section in a substantially axial direction.

In a further non-limiting embodiment of any of the foregoing flow injection devices, a valve is used to selectively control the flow through the passage.

A method of communicating flow through a gas turbine engine having multiple flow paths includes, among other things, moving core flow along a core flow path from a compressor section to an exhaust section, and selectively communicating a first amount of bypass flow from a bypass duct to the exhaust section or a second amount of bypass flow from the bypass duct to the exhaust section. The first amount different than the second amount.

In a further non-limiting embodiment of the foregoing method of communicating flow through a gas turbine engine having multiple flow paths, the bypass duct is a secondary bypass duct and the bypass flow path is an intermediate bypass flow path. The method further comprises communicating the first amount or the second amount of bypass flow radially across a primary bypass duct that provides a fan discharge bypass flow path radially between the intermediate bypass flow path and the core flow path.

In a further non-limiting embodiment of any of the foregoing methods of communicating flow through the gas turbine engine having multiple flow paths, the first amount comprises no bypass flow.

DESCRIPTION OF THE FIGURES

The various features and advantages of the disclosed examples will become apparent to those skilled in the art from the detailed description. The figures that accompany the detailed description can be briefly described as follows:

FIG. 7A shows a section view at line 7-7 in FIG. 5 with the valve in a first position that permits a first amount of flow.

FIG. 7B shows the section view of FIG. 7A with the valve in a second position that permits a second amount of flow.

FIG. 8A shows a section view at line 7-7 in another example embodiment with a valve in a first position that permits a first amount of flow.

FIG. 8B shows the section view of FIG. 8A with the valve in a second position that permits a second amount of flow.

FIG. 9A shows a section view at line 7-7 in another example engine with a valve in a first position that permits a first amount of flow.

FIG. 9B shows the section view of FIG. 9A with the valve in a second position that permits a second amount of flow.

DETAILED DESCRIPTION

Figure 1:
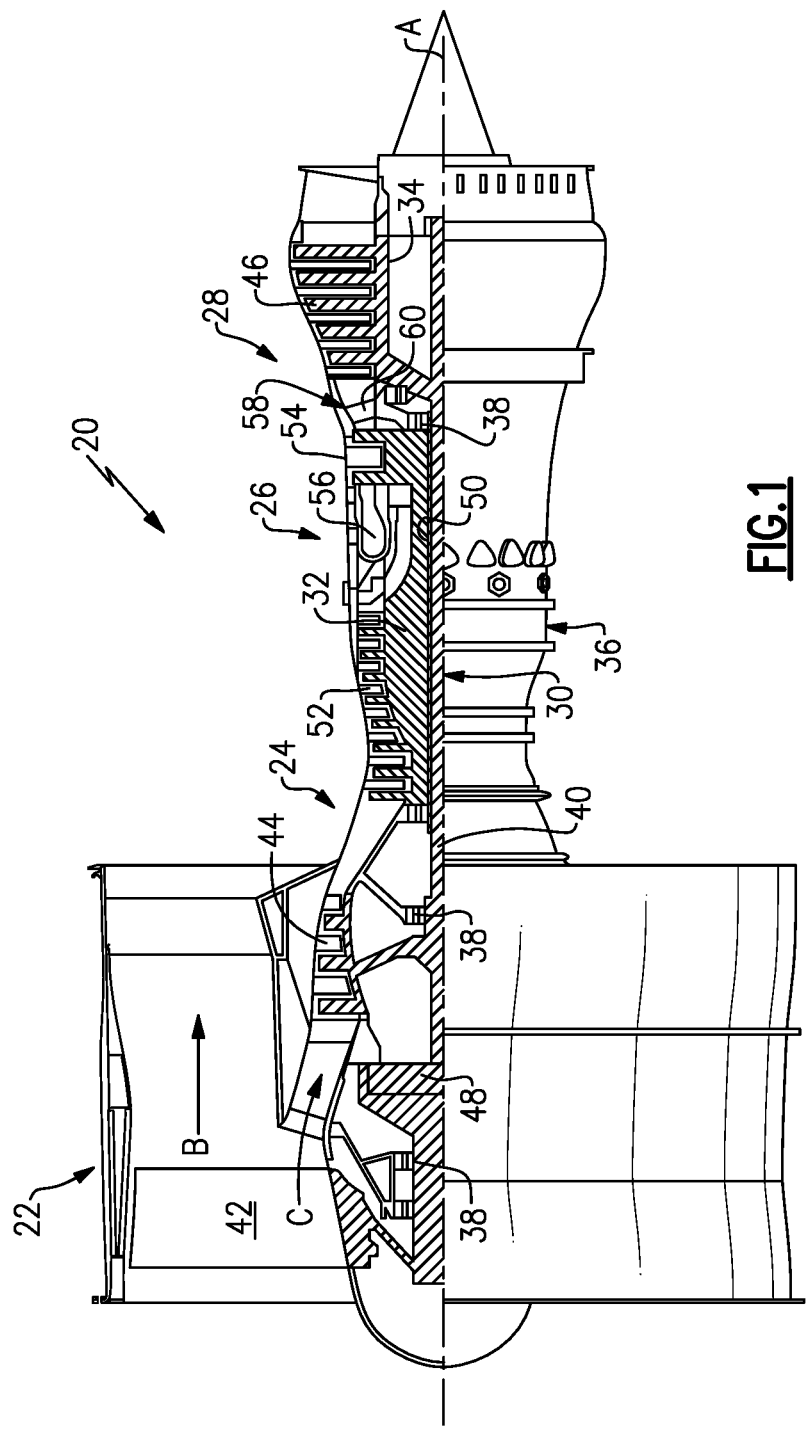
FIG. 1 schematically illustrates an example gas turbine engine.
Figure 2:
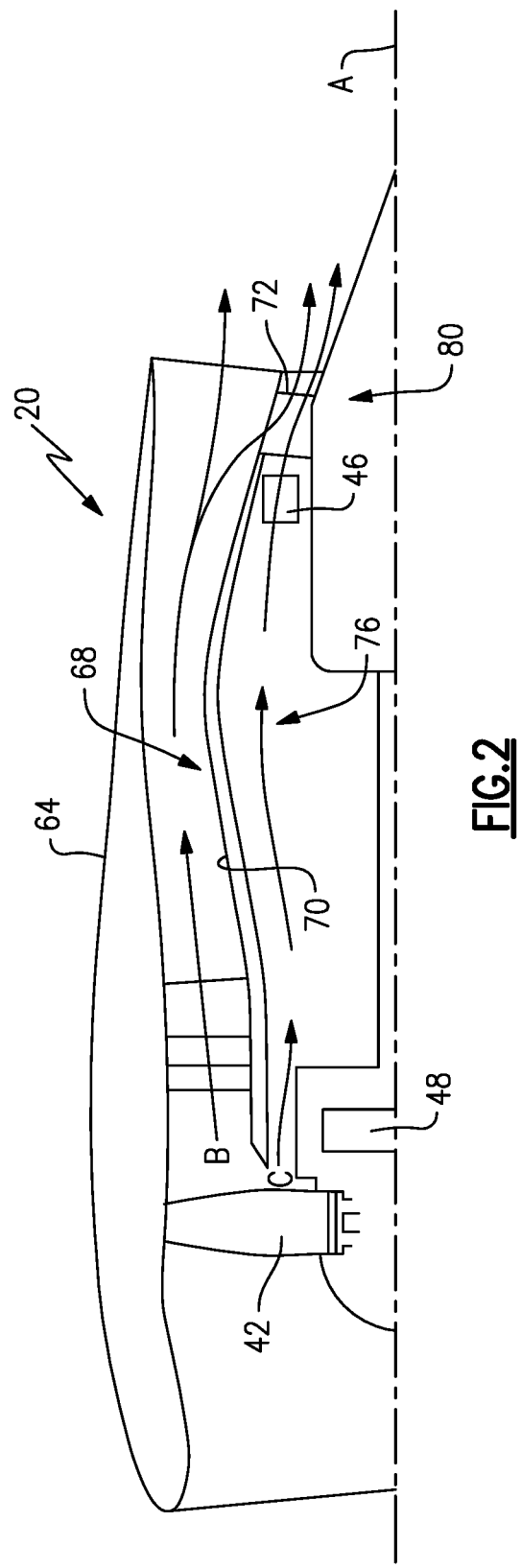
FIG. 2 illustrates a highly schematic view of a portion of the engine of FIG. 1 with cowls.

FIGS. 1 and 2 schematically illustrate an example gas turbine engine 20 that includes a fan section 22, a compressor section 24, a combustor section 26, and a turbine section 28. Alternative engines might include an augmentor section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 directly or through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow flowpath C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes stator vanes 60, which are in the core airflow path and function as an inlet guide vane for the low pressure turbine 46. Utilizing the stator vanes 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by air in the bypass flowpath B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The example engine 20 includes an outer cowl 64, in FIG. 2. The bypass flow B moves along a bypass flow path 68 provided between the outer cowl 64 and an engine core 70. At an aft end of the engine 20, a flow injection device 72 selectively permits some of the bypass flow to move into a core flow path 76 of the engine core 70. The flow exits the flow injection device 72 and mixes with the core flow C from the low pressure turbine 46 that is moving through an exhaust section 80 of the engine 20. The area of the engine 20 aft of the low pressure turbine 46 is generally referred to as the exhaust section 80.

The flow injection device 72 thus introduces some of the bypass flow to the core flow in the exhaust section 80. A valve (not shown if FIG. 2) may be moved between positions that permit more flow and positions that permit less flow through the flow injection device 72. Generally, in this example, a bypass flow is a flow path radially outside another flow path.

Introducing bypass flow B from the bypass flow path 68 into the core flow path 76 in the area of the exhaust section 80 facilitates, among other things, removing thermal energy from the exhaust section 80 to provide cooling of selected components. The introduction of additional fuel and associated combustion can also augment thrust generated by engine 20.

Figure 3:
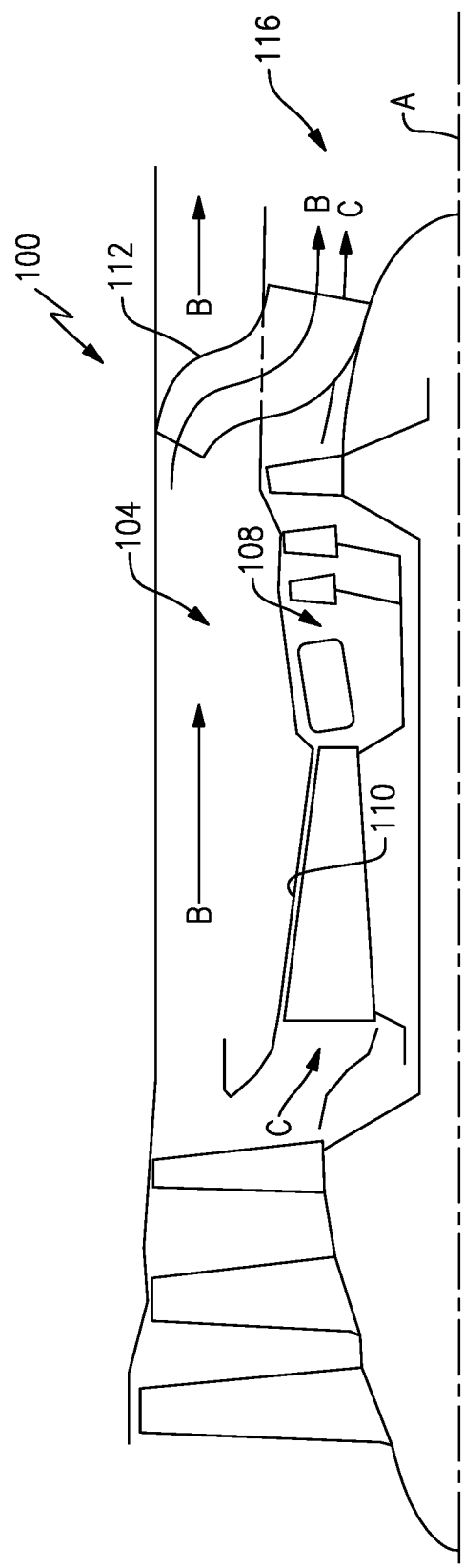
FIG. 3 schematically illustrates another example gas turbine engine.

Referring now to FIG. 3, another example gas turbine engine 100 includes a bypass flow path 104 that is a fan discharge bypass flow path. A core flow path 108 extends through an engine core 110 of the gas turbine engine 100. A flow injection device 112 selectively introduces flow from the bypass flow path 104 to the core flow path 108 at an exhaust section 116 of the gas turbine engine 100.

Figure 4:
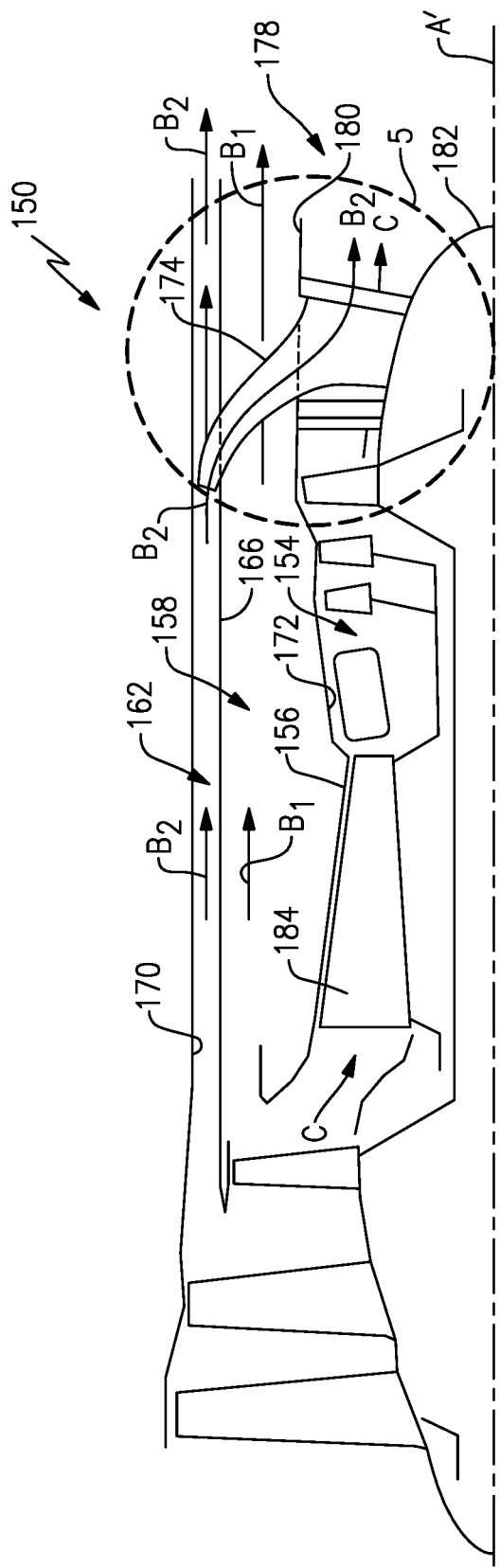
FIG. 4 schematically illustrates yet another example gas turbine engine.

Referring now to FIG. 4, yet another example engine 150 includes two bypass flow paths radially outside a core flow path 154 of a core engine 156. A first bypass flow path 158 is a fan discharge bypass flow path. A second bypass flow path 162 is an intermediate fan bypass flow path. The second bypass flow path 162 is radially outside the first bypass flow path 158. The engine 150 may incorporate adaptive features and associated control effectors required to preferentially alter the ratio of flows 154, 158, and 162 depending on the desired engine performance (not shown).

A primary bypass duct 166 provides a radially outer boundary of the first bypass flow path 158. A secondary bypass duct 170 provides a radially outer diameter of the second bypass flow path 162. The primary bypass duct 166 provides a radially inner boundary of the secondary bypass flow path 162. An outer case 172 of the core engine provides a radially inner boundary of the primary bypass flow path 158.

In this example, a flow injection device 174 is configured in a periodic array. The flow injection device 174 communicates flow $B_2$ from the second bypass flow path 162 to the core flow path 154. Flow $B_2$ mixes with core flow C and exits from the flow injection device 174 at an exhaust section 178 of the engine 150.

An augmentor or exhaust flowpath cooling liner 180 provides a radially outer boundary of the exhaust section 178 for the exhaust from the core flow path 154. A tailcone or centerbody 182 provides the radially inner boundary.

Flow $B_1$ moving along the first bypass flow path 158 flows around a flow injection device 174 and exits the engine 150. In other examples, some of the flow $B_1$ could also flow through the flow injection device 174 to the core flow path 154, such as through an aperture (not shown) of the flow injection device 174 positioned within the first bypass flow path 158.

The first bypass flow path 158 and the second bypass flow path 162 both extend axially from at least a compressor section 184 to the exhaust section 178 of the engine 150. The flow injection device 174 extends generally radially across the first bypass flow path 158.

The example flow injection device 174 is configured to selectively communicate flow from the second bypass flow path 162 to the exhaust section 178. In some examples, a valve (not shown in FIG. 4) selectively blocks flow through the flow injection device 174 to control the introduction of fluid from the second bypass flow path 162 to the exhaust section 178. The selective blocking using the valve of the flow injection device 174 may be accomplished independently or with adaptive features that may selectively vary the flows $B_1$, $B_2$, C, or some combination in these.

Figure 5:
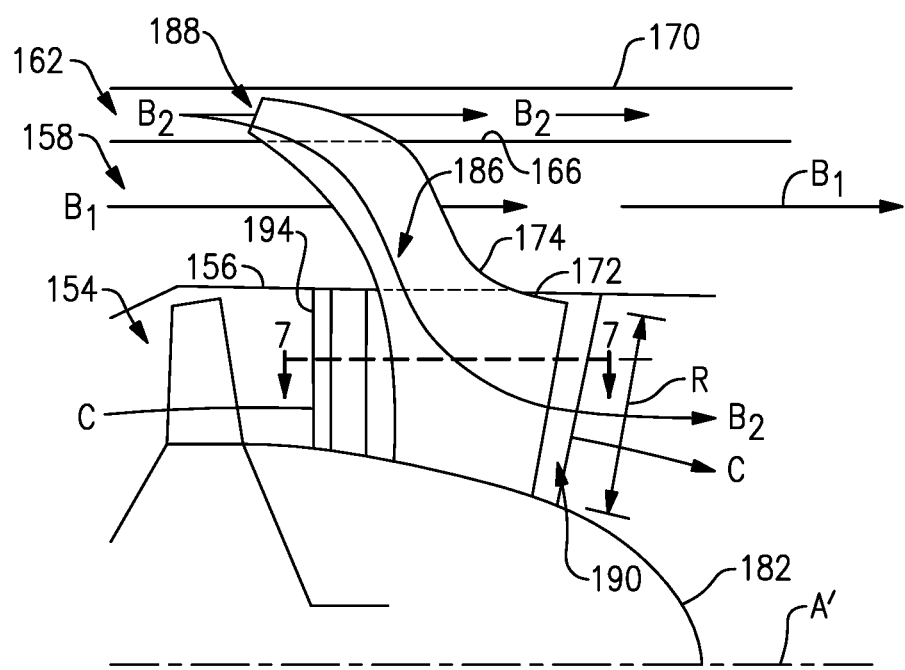
FIG. 5 shows a close-up view of area 4 in FIG. 4.
Figure 6:
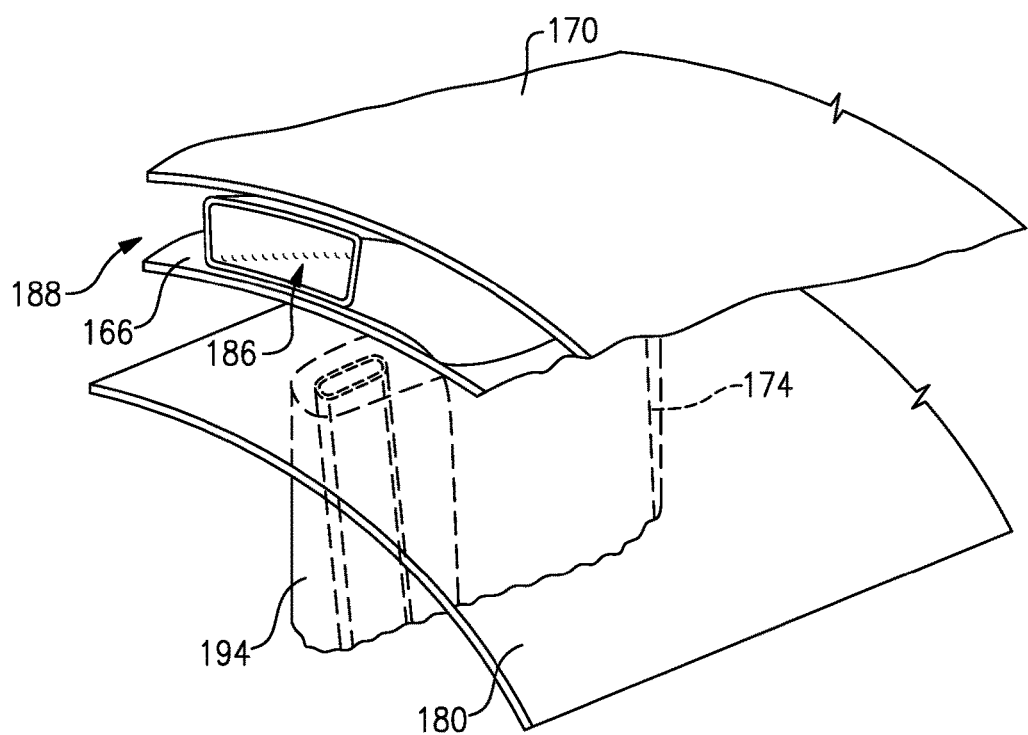
FIG. 6 shows a perspective view of inlets to an array of flow injection devices in the gas turbine engine of FIG. 4.

Referring now to FIGS. 5 and 6 with continuing reference to FIG. 4, the example flow injection device 174 includes a flow passage 186 that extends from an inlet 188 to an outlet

190. The outlet 190, in this example, extends radially a distance R that is more than half the radial width of the core flow path 154 in the axial area of the outlet 190. The example outlet 190 is upstream from an aft end of the tailcone 182.

The example inlet 188 of the flow passage 186 extends radially past the primary bypass duct 166 into the second bypass flow path 162. The inlet 188, in this example, has the form of a scoop. That is, the inlet 188 extends into the second bypass flow path to scoop and redirect flow from the second bypass flow path 162 radially inward. The inlet 188 is along a plane that is oriented transverse to the general direction of flow along the second bypass flow path 162.

In another example, the inlet 188 is not a scoop and the inlet is formed in the bypass duct 166 such that the inlet is along a plane aligned with the general direction of flow along the second bypass flow path 162.

In another example, the inlet 188 may be positioned within the first bypass flow path 158, such that the inlet 188 does not extend radially past the bypass duct 166.

One or more discrete hollow vanes 194 provides the flow passage 186 in this example. The engine 150 may include an array of the vanes 194 distributed annularly about a centerline A' of the engine 150. The vanes 194 are nested mixer vanes, for example. The array may include sixteen total vanes 194. In other examples, the array may include more than sixteen vanes 194 or less than sixteen vanes 194.

In some examples, some of the vanes 194 in the array communicate flow from the first bypass flow path 158 to the core flow path 154, and others of the vanes 194 in the array communicate flow from the second bypass flow path 162 to the core flow path 154. Some of the vanes 194 could also communicate flow from both the first bypass flow path 158 and the second bypass flow path 162 to the core flow path 154 by passing flows through common vanes or by alternating vanes 194 to carry individual flows.

Some of the vanes 194 could also communicate flow from second bypass flow path 162 to the first bypass flow path 158. In such an example, the first bypass flow path 158 is considered a "core" flow path relative to the second bypass flow path 162.

Referring now to FIGS. 7A and 7B, the example flow injection device 174 extends from a leading edge L to a trailing edge T along an axis D. The axis D, in this example, is not parallel to an axis A' of the engine 150. Thus, the flow injection device is considered tilted circumferentially.

A forward portion of the section of the flow injection device 174 that is within the core flow path includes a ring-strut-ring structure 192. A turbine exhaust case (not shown) of the engine 150 provides a location for the ring-strut-ring structure 192.

A portion of the flow injection device 174 within the core flow path 154 defines the flow passage 186. A valve 196 is disposed within this area of the flow passage 186 and is operably linked to a controller 198. The valve 196 provides an adaptive feature that is actuated in response to commands from the controller 198 between the first positions and the second positions. The first positions permit a first amount of flow to the outlet 190. The second positions permit a second amount of flow through the outlet 190. The first amount of flow comprises no flow through the outlet 190 in this example. The second amount of flow through all the flow injection devices 174 of the engine 150 may be up to 15 percent of the total bypass flow $B_2$ upstream the flow injection device 174. The second amount of flow could also be more than 15% of the total bypass flow $B_2$.

The selective flow enables more flow to be directed to the core flow path 154 in the exhaust section 178 when, for example, more cooling is desired. Flow through the trailing edge could also be increased to facilitate augmentation or to affect desire changes in engine augmented thrust, dry power thrust, part-power TSFC (fuel burn), etc.

Referring now to FIGS. 8A and 8B, another example flow injection device 174b includes a flow passage 186b terminating at an outlet 190b. The flow injection device 174b extends along an axis D' that is aligned with the axis A' of the engine 120. The flow injection device 174b includes a valve 196b that moves between positions permitting the first amount of flow and positions that permit the second amount of flow in response to commands from a controller 198b. A controller 198b sends commands to the valve 196b.

Referring to FIGS. 9A and 9B, in yet another example flow injection device 174c, the flow passage 186c terminates at an outlet 190c. The flow injection device 174c extends from the leading edge L to the trailing edge T along an axis D" that is tilted circumferentially relative to the axis A' of the engine 120.

The flow injection device 174c includes a vane trailing edge aerodynamic closeout 200 that extends radially along the length of the outlet 190c and extends circumferentially into flow moving from the outlet 190c, such that the closeout 200 directs flow from the outlet 190c circumferentially. The closeout 200 may cause the fluid moving through the flow injection device to swirl more than fluid moving through the flow injection devices 174 or 174b. Swirling the fluid moving through the device may be desirable in some options. The swirl may facilitate stabilizing the exhaust section 178. The closeout 200 causes the flow injection device 174c to have a forward biased discharge slot or outlet 190c.

Features of the disclosed examples may allow adaptive injection of one or more bypass flows under specific desired operating modes. For example, dry power operation while flying in a combat environment may desire one mode, while cruise in a non-threat environment may desire another mode for reduced TSFC and fuel burn. This concept could alter the flow discharge, cooling or other characteristics of flow C depending on desired functionality of the flow and may expand the utility and benefit of emerging adaptive cycle engine architectures. The variable injection of the first bypass flow path 158 and the second bypass flow path 162 into the core flow path 154 may be combined to provide enhanced augmented operation via a swirl augmentor or other augmentor concepts.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of communicating flow through a gas turbine engine having multiple flow paths, comprising:
   moving core flow along a core flow path from a compressor section to an exhaust section;
   selectively communicating a first amount of bypass flow from a bypass flow path defined by a bypass duct to the exhaust section or a second amount of bypass flow from the bypass flow path to the exhaust section, the first amount different than the second amount;

wherein the bypass duct is a secondary bypass duct and the bypass flow path is an intermediate bypass flow path;

communicating the first amount or the second amount of bypass flow radially across a primary bypass duct that provides a fan discharge bypass flow path radially between the intermediate bypass flow path and the core flow path;

wherein the exhaust section includes a tailcone, and an outer diameter of the tailcone defines a radially inner boundary of the core flow path relative to an engine longitudinal axis of the gas turbine engine; and wherein the step of selectively communicating includes communicating the first amount or the second amount of bypass flow from the bypass duct to the exhaust section at a location radially outward of the tailcone relative to the engine longitudinal axis.

2. The method of claim 1, wherein the first amount comprises no bypass flow.

3. The method of claim 2, wherein the bypass flow path is radially outside the core flow path relative to the engine longitudinal axis of the gas turbine engine.

4. The method of claim 1, wherein the bypass flow path extends axially from the compressor section to the exhaust section relative to the engine longitudinal axis of the gas turbine engine.

5. The method of claim 4, wherein the bypass flow path is radially outside the core flow path relative to the engine longitudinal axis.

6. The method of claim 1, wherein the location is upstream from an aft end of the tailcone relative to a general direction of flow through the gas turbine engine.

7. The method of claim 1, wherein the step of communicating the first amount or the second amount of bypass flow radially across the primary bypass duct includes communicating the first amount or the second amount in a flow passage defines between an inlet and an outlet of at least one vane, the at least one vane extending radially from the bypass flow path to the exhaust section.

8. The method of claim 7, wherein the outlet is tilted circumferentially relative to the engine longitudinal axis to introduce flow to the exhaust section in a direction having a circumferential component.

9. The method of claim 7, wherein the outlet introduces flow against a closeout projecting circumferentially from a flow injection device such that the closeout directs flow from the outlet circumferentially relative to the engine longitudinal axis.

10. The method of claim 7, wherein the outlet is aligned with the engine longitudinal axis to introduce flow to the exhaust section in a substantially axial direction relative to the engine longitudinal axis.

11. The method of claim 7, further comprising moving a valve between a first position and a second position to adjust the flow through the flow passage.

12. The method of claim 7, wherein the inlet is defined by a scoop that extends into the bypass flow path to direct flow radially inward to the core flow path.

13. The method of claim 12, wherein the scoop extends radially outward from a radially inner boundary of the secondary bypass duct relative to the engine longitudinal axis, and the inlet faces in an axially forward direction relative to the engine longitudinal axis.

14. The method of claim 1, wherein the step of selectively communicating includes moving a valve between a first position and a second position, the first position correspond-ing to the first amount of bypass flow, and the second position corresponding to the second amount of bypass flow.

15. A method of communicating flow through a gas turbine engine having multiple flow paths comprising:

moving core flow along a core flow path from a compressor section to an exhaust section;

selectively communicating a first amount of bypass flow from a bypass flow path defined by a bypass duct to the exhaust section or a second amount of bypass flow from the bypass flow path to the exhaust section, the first amount different than the second amount;

wherein the exhaust section includes a tailcone, and an outer diameter of the tailcone defines a radially inner boundary of the core flow path relative to an engine longitudinal axis of the gas turbine engine;

wherein the bypass duct is a secondary bypass duct and the bypass flow path is an intermediate bypass flow path;

communicating the first amount or the second amount of bypass flow radially across a primary bypass duct that provided a fan discharge bypass flow path radially between the intermediate bypass flow path and the core flow path; and wherein the first amount comprises no bypass flow.

16. A method of communication flow through a gas turbine engine having multiple flow paths comprising:

moving core flow along a core flow path from a compressor section to an exhaust section;

selectively communicating a first amount of bypass flow from a bypass flow path defined by a bypass duct to the exhaust section or a second amount of bypass flow from the bypass flow path to the exhaust section, the first amount different than the second amount;

wherein the exhaust section includes a tailcone, and an outer diameter of the tailcone defines a radially inner boundary of the core flow path relative to an engine longitudinal axis of the gas turbine engine;

wherein the bypass duct is a secondary bypass duct and the bypass flow path is an intermediate bypass flow path;

communicating the first amount or the second amount of bypass flow radially across a primary bypass duct that provides a fan discharge bypass flow path radially between the intermediate bypass flow path and the core flow path;

wherein the step of communicating the first amount or the second amount of bypass flow radially across the primary bypass duct includes communicating the first amount or the second amount in a flow passage defined between an inlet and an outlet of at least one vane, the at least one vane extending radially from the bypass flow path to the exhaust section; and wherein the at least one vane is an array of vanes including a first set of vanes and a second set of vanes, and further comprising communicating flow from the bypass flow path to the core flow path with the first set of vanes, and communicating flow from the fan discharge bypass flow path to the core flow path with the second set of vanes.

17. The method of claim 16, wherein at least some vanes of the array of vanes communicate from both the bypass flow path and the fan discharge bypass flow path to the core flow path.

18. The method of claim 16, wherein each vane of the array of vanes includes sidewalls that extend between a leading edge and a trailing edge, with the outlet defined along one of the sidewalls.

19. The method of claim 16, further comprising moving a valve between a first position and a second position to adjust the flow through the flow passage.

20. The method of claim 18, further comprising moving a valve between a first position and a second position to adjust the flow through the flow passage in response to a controller.

\* \* \* \* \*